Patented Aug. 31, 1937

2,091,691

UNITED STATES PATENT OFFICE 2,091,691

GLASS COMPOSITION

Samuel R. Scholes, Alfred, N. Y., assignor to Celo Mines, Inc., Burnsville, N. C., a corporation of North Carolina No Drawing. Application October 23, 1935, Serial No. 46,446

5 Claims. (Cl. 106—36.1)

This invention relates to glass compositions and materials useful in making the same. The invention comprehends a novel method of introducing alumina into glass compositions, and a new method of preparing a source of alumina-containing material. The invention further embraces the commercial utilization of the mineral kyanite (cyanite) in glass making, the preparation of such kyanite for such utilization, and the process and product of such use.

The introduction of alumina, $Al_2O_3$, into glass-compositions is now being accomplished by the use of materials such as calcined alumina, alumina hydrate, feldspar, and kaolin. For the best results, both technical and economic, materials for this purpose must have the following characteristics:

1. Physical condition permitting good admixture with other batch-ingredients.
2. Freedom from objectionable impurities, especially iron oxides and other heavy-metal oxides, in more than minimal amounts.
3. Constant composition as to alumina and other oxides, within specified limits.
4. Low net cost per unit of alumina contained.
5. Availability in abundant quantity.
6. The essential property of dissolving readily in the melt, and becoming incorporated into a homogeneous glass.

I have discovered that the mineral kyanite represented by the formula $Al_2O_3SiO_2$, not hitherto used commercially in glass-making, meets these requirements excellently, if properly prepared, and offers specific advantages over the aluminous materials mentioned as now in use. These advantages can be shown by discussing the above requirements in order:

1. Kyanite is prepared from the original rock or mineral deposit in a pulverulent or granular condition. The particles are non-adherent, and the material will not segregate in balls or lumps as kaolin does, nor exhibit the fluffy, floating character of alumina hydrate. It behaves physically like glass sand.

2. In its process of preparation, kyanite can be reduced to an iron-oxide content well below 0.1 per cent., with not more than traces of other heavy metals. Since its alumina content is easily three times that of feldspar, only one-third as much need be used per batch, and the quantity of $Fe_2O_3$ carried into the glass will be as low as with a feldspar containing 0.033 per cent. $Fe_2O_3$.

3. Modern methods of refinement produce a kyanite of alumina-content constant within 1.5 per cent., equivalent to a constancy for feldspar within 0.5 per cent. The impurity present in kyanite is almost entirely silica (quartz), which offers no difficulties. Bases are absent.

4. Kyanite is prepared by a relatively cheap process, which, in view of its high alumina content (56 per cent. $Al_2O_3$ in a 90 per cent. concentrate), offers substantial economies in comparison with other aluminous materials of equal purity.

5. The available supply is very large.

I have found that kyanite dissolves readily in a glass-melt in which it is a batch ingredient, provided it is ground to a fineness of preferably 60 mesh.

Prior to 1923, it was thought that kyanite inverted to sillimanite at temperatures from 1320 to 1380 degrees C. Later scientific investigation showed that kyanite dissociates at high temperatures into crystalline silica and mullite, a compound having the formula $3Al_2O_3.2SiO_2$. Mullite has a melting point above 1800 degrees C. In the inversion of kyanite into mullite at high temperatures, the dissociation of kyanite is accompanied by large expansion and friability of the resulting product.

I have discovered that if refined kyanite is finely ground, it will readily dissolve in a glass-melt without leaving any evidence of undissolved mullite when a glass of commercial composition, with an alumina-content as high as current practice requires, is made with kyanite as the aluminous ingredient of the batch. This is a decided economic advantage and furnishes a new and effective means of introducing alumina into commercial glasses, thereby securing in a cheap and efficient manner the beneficial effects of alumina upon the strength, viscosity, chemical durability, and thermal endurance of the glass. The inversion of kyanite to mullite involves an expansion of about 10% in volume and the formation of new, fine crystals of mullite and silica. These crystals offer a relatively large surface for attack, and dissolve readily in the melting batch of glass.

Alumina increases the viscosity of commercial glass, but it is important that this effect not be allowed to become localized and produce defects such as "cords" and other results of inhomogeneity.

Aluminum hydrate is sometimes used as a raw material for glass, although its cost is very high because it is a manufactured product. The same is true of its calcined form, or anhydrous oxide. The almost immediate result of introducing aluminum hydrate as a batch ingredient is the formation of the high melting calcined alumina, having a melting point above 2050 degrees C.

Kyanite properly prepared according to this invention should be ground to a fineness such that, upon melting in a glass batch, no evidence of undissolved mullite appears. The kyanite should be ground preferably to 60 mesh, but in large scale melting, a coarser granulation might be used, say up to 20 mesh. However, the grinding should be fine enough so that thorough dissemination of the aluminous material takes place throughout the batch and renders the resulting glass homogeneous.

What is claimed is:

1. The method of making homogeneous commercial glass containing alumina and capable of being fashioned into glassware which comprises the step of introducing into the melt as a batch ingredient kyanite in a finely granular condition such as will pass through a 20 mesh up to a 60 mesh screen.

2. A charge for aluminous glass capable of being fashioned into commercial glassware comprising kyanite ground to 60 mesh fineness as a batch ingredient.

3. The method of introducing $Al_2O_3$ into glass compositions which comprises the steps of preparing kyanite in the pulverulent condition with an iron oxide content below 0.1%, an alumina-content constant within 1.5%, and adding the same to a glass batch capable of being fashioned into glassware in such a finely ground condition that no evidence of undissolved mullite appears in the final product.

4. The method of making alumina-containing glass capable of being fashioned into commercial glassware which comprises preparing a glass melt without alumina, and incorporating a commercial alumina-content by the addition to the melt of kyanite ground to 60 mesh.

5. The method of introducing alumina into commercial glass capable of being fashioned into glassware which comprises introducing concentrated purified kyanite, the major portion ground to a fineness within the range of 20 to 60 mesh.

SAMUEL R. SCHOLES.